Oct. 15, 1935.   J. H. BAILEY   2,017,680
REGISTER
Filed June 6, 1932   2 Sheets-Sheet 1

INVENTOR:
James H. Bailey
BY Ramsey and Kent
ATTORNEYS.

Oct. 15, 1935.                J. H. BAILEY                2,017,680
                                REGISTER
                          Filed June 6, 1932          2 Sheets-Sheet 2
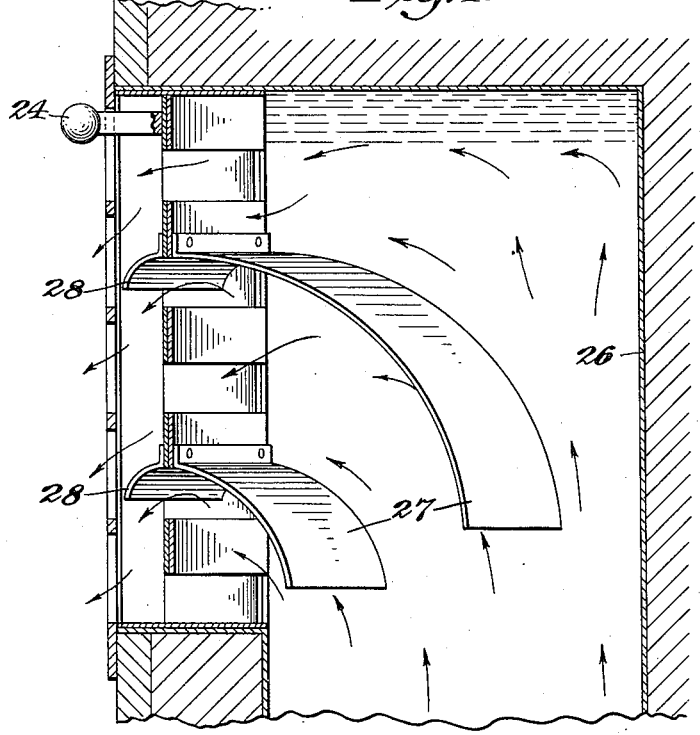
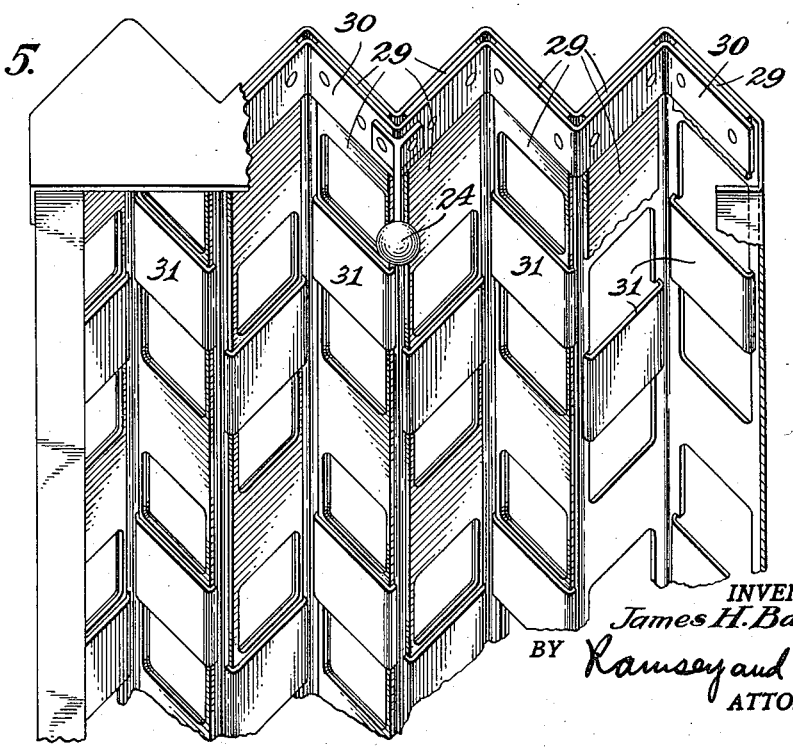
INVENTOR:
James H. Bailey
BY Ramsey and Kent
ATTORNEYS.

Patented Oct. 15, 1935

2,017,680

UNITED STATES PATENT OFFICE 2,017,680

REGISTER

James H. Bailey, New Canaan, Conn., assignor to Hart, Cooley, Highton, Co., New Britain, Conn.

Application June 6, 1932, Serial No. 615,491

1 Claim. (Cl. 98—101)

This invention relates to a device for controlling the flow of air or gases through a conduit.

The invention may be described more particularly as an improved air register.

A particular object of the invention is to provide a register of simple, strong and economical construction but which is at the same time highly efficient and which will when open provide a substantially unimpeded outlet from the air conduit and a uniform distribution of air.

The principal parts of the register are a damper which slides to and fro in a substantially straight line motion across a stationary plate, the damper and stationary plate being provided with openings which register when the damper is in open position and which are closed when the damper is in closed position. In order to provide for a maximum amount of opening and for an improved air flow through the register, the stationary plate and damper are both formed with corrugations or equivalent formations. For the purpose of maximum diffusion of air the openings are preferably staggered and arranged so that a closed face is angularly disposed opposite each opening.

In the preferred embodiment of the invention the base plate and damper are formed into a plurality of V-shaped ridges, openings being formed through both sides of the ridges.

Other objects and advantages of the invention will become apparent as the description proceeds. While a preferred form of the invention is disclosed herein for purposes of illustration, it should be understood that various changes may be made without departing from the spirit of the invention as hereinafter set forth and claimed.

In the drawings:

Fig. 4 is a section through a register mounted in an air duct and illustrating further modifications;

Fig. 5 is a fragmentary perspective illustrating an additional modification.

Figure 1:
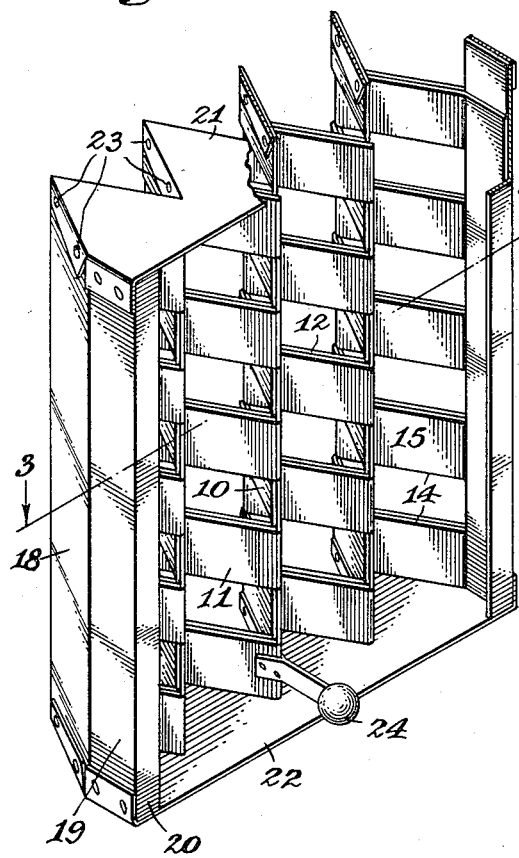
Fig. 1 is a perspective looking at the front face of the register with certain parts removed and other sections broken away.

Referring to the drawings more particularly, the reference numeral 10 indicates the stationary plate, and the numeral 11 refers to the sliding damper. The stationary plate is formed into a plurality of V-shaped ridges, and the sliding damper is given a similar shape, so that these two members are in close sliding contact. The stationary plate and the sliding damper are formed with complementary openings arranged to register when the damper is in open position, and to be out of register when the damper is in closed position. Any suitable arrangement of openings could be employed. The particular arrangement illustrated involves forming a plurality of rectangular openings 12 on each slope of each of the V-shaped ridges of the stationary plate. The openings 12 are separated from each other by panels 13 which are of the same shape as the openings and slightly wider. If desired, the openings 12 on the two sides of one of the V-shaped ridges can be in direct alignment, although in the preferred form as illustrated the openings on one side of the ridge are arranged in staggered relation to those on the other side of the ridge.

The sliding damper 11 is formed with openings and panels 14 and 15 which are of the same size and shape as the openings and panels in the stationary plate, respectively, so that when the damper is in the open position illustrated in Fig. 1, the openings in the damper coincide exactly with the openings in the plate.

Figure 2:
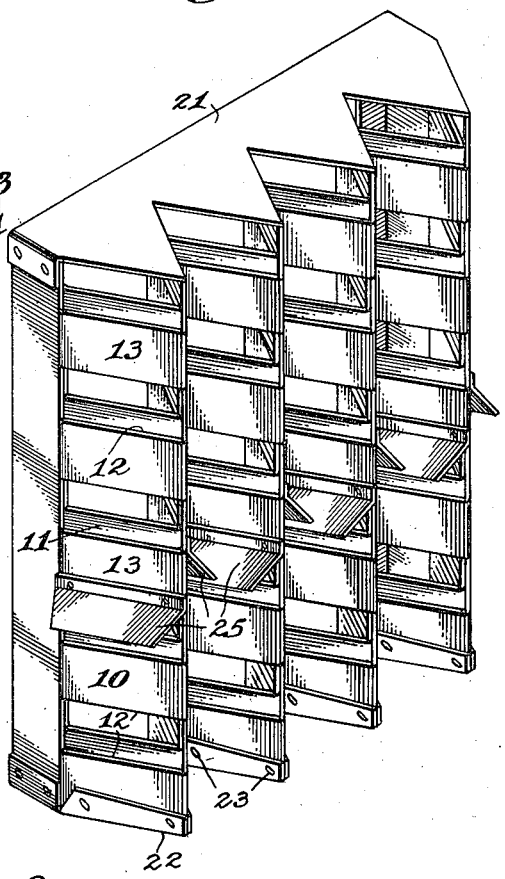
Fig. 2 is a perspective looking at the rear of the register of Fig. 1 and further showing certain modifications.

The damper and the plate are preferably of rectangular outline, and the damper is arranged to slide to and fro over the plate in a direction parallel to the tops of the ridges. In this direction the damper is as much shorter than the plate as the width of one of the panels. (See Fig. 1.) By sliding the damper upwardly from the position of Fig. 1, the panels of the damper can be made to completely close the openings in the plate, thereby completely shutting off flow of air through the register. The half open position of the register is illustrated in Fig. 2 and obviously the damper can be moved to a position creating any amount of opening between the full open position of Fig. 1 and the full closed position.

Instead of forming the plate and sliding damper into V-shaped corrugations, they could be formed into any equivalent corrugation or formation which will permit these members to be formed with openings the total area of which more closely approaches the total area of the front face of the register than is possible if the plate and damper are flat. By the use of this arrangement the register provides for a substantially unrestricted flow of air through the register when it is open, and provides for a complete closure when it is in closed position.

The staggered arrangement of the openings provides for a diffusion of the air coming through the register by reason of the fact that the air coming through any one of the openings is partially deflected by the panel disposed opposite the opening. Also, some of the air approaching the register from the conduit will first strike one of the panels and will then be deflected through the opposite opening. As the result of these deflections, the air is diffused, and there is no tendency for the register to shoot a plurality of small streams of air into the room, even when the register is only slightly open.

In the form of the invention disclosed herein the sliding damper is made from a single piece of sheet metal and is bent into a plurality of V-shaped corrugations 16, the sides of the damper parallel to the ridges of the corrugations being extended forwardly to form parallel guide flanges 17. The stationary plate 10 is also made of a single piece of sheet metal formed into corresponding V-shaped corrugations 18 and with forwardly extending flanges 19 which guide the flanges 17. The forward edges of flanges 19 are bent over to form retaining flanges 20 which keep the sliding damper in close contact with the stationary plate.

The casing for the register is completed by a top plate 21 and a bottom plate 22, the top and bottom plates being appropriately shaped to conform to the corrugations of the stationary plate and being held in place by any appropriate means such as the spot welding indicated at 23. The sliding damper is operated by any preferred mechanism, such as the handle member 24, and a grillework of any preferred type is placed over the front of the register before it is installed.

This construction provides a very efficient and economical register, as the parts can be very inexpensively formed and assembled. The corrugated form of the back plate provides for a maximum opening through the register and at the same time makes for a compact construction, since the excess metal of the stationary plate is formed into corrugations which extend toward the front of the casing. These corrugations strengthen and stiffen the entire construction.

It will of course be clear that the invention is not limited to the exact construction illustrated; for example, the sliding damper and stationary plate instead of being made of single unitary pieces of sheet metal can be assembled from strips of metal, or the parts of the register can be made up as castings or stampings any convenient number of parts being used to form the finished register.

The register can be installed with the corrugations running vertically, as illustrated in Figs. 1 and 2, or it may be installed with the corrugations running horizontally.

When the register is installed in the vertical position of Figs. 1 and 2, it may be advisable to use the deflector vanes 25, illustrated in Fig. 2. These deflector vanes extend rearwardly from the stationary plate 10, at a downward angle, the deflector vanes being disposed in a row across the back of the register at about its center, each deflector vane being located just above one of the openings in the stationary plate and being held in place by any preferred means as by spot welding. These deflector vanes engage the air rising in the vertical conduit and assist in forcing it through the lower part of the register, as without these vanes there is a tendency for the air to crowd through the upper part of the register, only a small proportion passing through the lower part of the register. Thus the deflectors assist in equalizing the flow through the upper and lower parts of the register.

It is clearly shown in Figs. 1 and 2 that at one end of the register both the stationary plate and the damper are closed all the way across, the closed ends being slightly wider than the width of the openings 12, so that when the damper is moved upwardly from the position illustrated in Fig. 1 to the closed position there will be no openings left uncovered.

One of the important problems in directing the air flow through a register is to prevent the air from rising straight upwardly along the wall above the register. The present invention includes means for directing the air outwardly into the room.

Fig. 4 illustrates how the register can be installed in an air conduit 26 with the closed ends of the plate and damper at the top. In this case the register is at the dead end of the conduit and the closed ends of the plate and damper act to form an air cushion at the top of the conduit. The air ascending in the conduit is deflected by the air cushion outwardly and downwardly into the room.

To further assist in guiding the air outwardly into the room, deflector vanes as illustrated in Fig. 4 can be used. The vanes 27 extend into the conduit and are preferably curved to deflect the air forwardly. Each of the vanes 27 is attached to the stationary plate at a point just above one of the openings. In the form illustrated a row of vanes 27 is disposed across the lower part of the register and a second row of vanes extends across the upper part of the register. When an upper row of vanes is used it is preferred to have them project farther into the conduit in order to extend into the rising current of air that is undisturbed by the lower vanes.

The deflector vanes can be mounted on both sides of each V-shaped corrugation in locations similar to those of the vanes 25 of Fig. 2, or they may be placed on one side of each corrugation, in which case they would all be placed on the same side.

Additional means to deflect the air outwardly and downwardly may be supplied in the form of vanes 28 attached to the front of the sliding damper. Each of the vanes 28 is so positioned that when the damper is in open position, the vane 28 will form a continuation of one of the vanes 27. Each of the vanes 28 is appropriately formed to deflect the air forwardly and downwardly.

Figure 3:
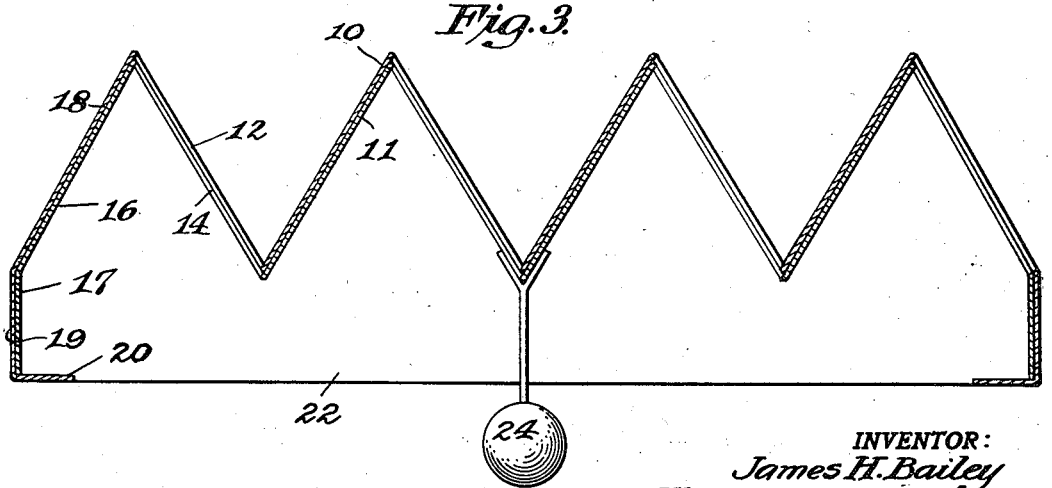
Fig. 3 is a section on line 3—3 of Fig. 1.

Throughout the present specification and claims the term "damper" is used to refer either to a construction in which the damper is formed in a single piece, as illustrated in Figs. 1 to 3, or to a construction in which the damper is formed of a plurality of separate slide strips, as in Fig. 5.

In Fig. 5 each slide strip 29 is formed with panels and openings corresponding to the panels and openings in one of the flat faces of the stationary plate 10. The slide strips may be operated by any preferred mechanism, the operating device illustrated comprising a common operating bar 30 to which the operating handle 24 and each of the slide strips is fastened. Suitable arrangement can be made for holding the slide strips in contact with the face of the stationary plate. For example, certain of the panels of the stationary plate can be bent forwardly to form holding straps for the slide strips, as shown at 31.

Attention is particularly called to the fact that as the result of the corrugated form of the back plate of the register, the completed register is relatively shallow and it can be mounted to avoid interference with the flow of air in the duct.

I claim:

In combination, an air conduit, a register mounted in the air conduit and comprising a stationary plate, a sliding damper, the plate and damper each being formed with openings, the openings of one part being adapted to be in or out of register with the openings of the other part when the parts are in open or closed positions, respectively, a plurality of deflector vanes carried by the stationary plate, each vane being located above an opening and extending into the conduit, one of the deflector vanes being located above the other and the upper vane extending farther into the conduit than the lower vane.

JAMES H. BAILEY.